(12) United States Patent
Yao et al.

(10) Patent No.: US 8,923,181 B2
(45) Date of Patent: Dec. 30, 2014

(54) METHOD AND APPARATUS FOR CONTROLLING MULTICAST IP PACKETS IN ACCESS NETWORK

(75) Inventors: Chunyan Yao, Shanghai (CN); Haibo Wen, Shanghai (CN); Jun Zheng, Shanghai (CN); Fanxiang Bin, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 496 days.

(21) Appl. No.: 12/733,703

(22) PCT Filed: Sep. 19, 2008

(86) PCT No.: PCT/CN2008/001624
§ 371 (c)(1),
(2), (4) Date: Jul. 26, 2010

(87) PCT Pub. No.: WO2009/046622
PCT Pub. Date: Apr. 16, 2009

(65) Prior Publication Data
US 2010/0290463 A1 Nov. 18, 2010

(30) Foreign Application Priority Data

Sep. 26, 2007 (CN) .......................... 2007 1 0046438

(51) Int. Cl.
*H04H 20/71* (2008.01)
*H04L 12/28* (2006.01)
*H04L 12/18* (2006.01)

(52) U.S. Cl.
CPC ........ *H04L 12/2881* (2013.01); *H04L 12/1877* (2013.01); *H04L 12/189* (2013.01)
USPC ............ 370/312; 370/328; 370/338; 370/390

(58) Field of Classification Search
CPC ..... H04W 72/005; H04W 4/06; H04W 28/04; H04L 12/189; H04L 12/1868; H04L 2001/0093
USPC .................................. 370/312, 328, 338, 390
See application file for complete search history.

(56) References Cited

U.S. PATENT DOCUMENTS 6,988,146 B1 * 1/2006 Magret et al. ................. 709/238
7,079,499 B1 * 7/2006 Akhtar et al. ................. 370/310
(Continued)

FOREIGN PATENT DOCUMENTS

| CN | 1665219 | 9/2005 |
|---|---|---|
| CN | 1960321 | 5/2007 |

(Continued)

OTHER PUBLICATIONS

International Search Report.
(Continued)

*Primary Examiner* — Jung Park
(74) *Attorney, Agent, or Firm* — Harness, Dickey & Pierce (57) ABSTRACT

The present invention proposes a method for controlling the uplink transmission of the multicast IP packet sourced from the UE in field of IP packet transmission in access network. According to the technical solution of the present invention, the access devices receives IP packet from the UE, checks the IP packet and determines whether the IP packet is multicast IP packet that is allowed to be accessed. If the access device determines that the IP packet is multicast IP packet that is allowed to be accessed, then it sends the multicast IP packet in multicast form. Via the present invention, the access device can allow the uplink valid multicast IP packet to pass, preferably, determines and intercepts the malicious attacks via multicast IP packet, so as to ensure the DSL access device's support for mobile IPv4, so as to keep the uninterrupted connection of the service to the user when the user moves between different subnets.

11 Claims, 4 Drawing Sheets

(56) References Cited

U.S. PATENT DOCUMENTS

| | | | |
|---|---|---|---|
| 7,346,053 B1 * | 3/2008 | Leung et al. | 370/390 |
| 2004/0208144 A1 * | 10/2004 | Vinayakray-Jani | 370/331 |
| 2005/0041634 A1 * | 2/2005 | Aura | 370/351 |
| 2005/0135365 A1 * | 6/2005 | Sung et al. | 370/390 |
| 2006/0182105 A1 * | 8/2006 | Kim et al. | 370/389 |

FOREIGN PATENT DOCUMENTS

| | | |
|---|---|---|
| EP | 1 798 900 | 6/2007 |
| EP | 2 202 919 | 6/2010 |
| JP | 2004-260317 | 9/2004 |
| WO | WO 2004/012394 | 2/2004 |
| WO | WO 2006/071055 | 7/2006 |
| WO | WO 2007/061177 | 5/2007 |

OTHER PUBLICATIONS

RFC3220:IP Mobility Support for IPv4 (C. Perkins, Ed. Et al.) Jan. 2002, 1.8, 2.1, 6.1-6.2.

IPv4 Mobility extension for Multicast and Broadcast Packets (C. Chakrabarti, et al.) draft-chakrabarti-mip4-mcbc-01, Jul. 8, 2007, whole document, http://tools.ietf.org/html/draft-chakrabarti-mip4-mcbc-01.

J-C Lee Etri, et al. "Considerations of NDP over IEEE 802.16 Networks; draft-lee-ndp-ieee802.16-00.txt," 20051015, Oct. 15, 2005, XP015042840, ISSN: 0000-0004.

Madanapalli Samsung ISO S: "IPv6 Neighbor Discovery over 802.16: Problems and Goals; draft-madanapalli-nd-over-802.16-problems-00.txt," 20051129, Nov. 29, 2005, XP015042873, ISSN: 0000-0004.

European Supplemental Search Report dated Mar. 23, 2012 for Application No. 08800617.6-2416/2197161 PCT.CN2008001624.

* cited by examiner

METHOD AND APPARATUS FOR CONTROLLING MULTICAST IP PACKETS IN ACCESS NETWORK

TECHNICAL FIELD

The invention relates to field of the IP packet transmission in access network, and particular to the uplink transmission control for the multicast IP packet sourced from the user equipment.

BACKGROUND OF THE INVENTION

In the current mobile telecommunication, each mobile agent, for example, edge router broadcasts the Agent Advertisement (AA) in its subnet, therefore, the Foreign Agent Care-of-Address (FACOA), which is allocated by MA and is a care of address (COA) corresponding to the MA, is informed to each user equipment (UE) in the subnet, so as to support the necessary service handover. However, since the UE may, during the service transmission, move from its home subnet to another subnet, hereinafter referred to as foreign subnet, if the UE waits for the broadcasted AA passively, the service may be interrupted due to the long time waiting.

In order to solve the problem, the UE may request the mobile agent in the current subnet to send AA by actively sending the agent solicitation (AS) message, which is an ICMP (Internet Control Message Protocol) router discovery message. For the UE, the mobile agent in the home subnet is called home agent, and HA for short; while the mobile agent in the foreign subnet is called foreign agent, and FA for short. Besides, the UE may register the relationship between the care of address that it uses, for example FACOA or COCOA, and its permanent address, for example, HOA (home address), to its HA. Therefore, when the counterpart node (CN) communicates with the UE, the CN first sends the IP packet to the HA of the UE, then the HA sends the IP packet to the corresponding FA via the tunnel in network layer, for example, the HA may encapsulates the IP packet based on IP protocol. After receiving the IP packet, the FA carries out the corresponding de-capsulation on the received packet, and forwards the packet to the UE according to the UE's address carried in the IP packet.

One subnet usually comprises multiple mobile agents, when the UE does not know the unicast address of any of the FAs in the current subnet, it is not feasible to send the AS in the unicast packet form. To this end, in the prior art, a specific multicast address is allocated for all the mobile agents in one subnet. When the UE moves into any subnet, as long as the AS message it sends carries the multicast address, access device can identify that the AS message is destined to all the mobile agents in the subnet.

With the further study in the fix and mobile network convergence (FMC), the mobile IPv4 service will be deployed in the fixed access network. However, since the operator prohibits the UE to send multicast IP packet from the economic and security point of view, the access devices, such as DSLAM, discard the IP packet whose multicast source is UE. Therefore, when the UE sends the AS in the form of multicast IP packet, the AS request message can not reach any mobile agent in the current subnet, thus cannot trigger the sending of AA, so that the service may be interrupted. For the same reason, RRQ message sent by the UE as multicast IP packet cannot reach any mobile agent either, so that the registration cannot be completed on time.

SUMMARY OF THE INVENTION

The invention is proposed to solve the aforementioned problems in the existing technology. The access devices in the telecommunication network are improved to determine and filter the received multicast IP packet sourced from the UE, and allow the multicast IP packet that satisfies the condition to pass, for example, only allow the agent solicitation message or the registration request (RRQ) message to pass, so that the UE can receive the COA in the current network on time and finish the registration, so as to keep the uninterrupted connection of the service.

According to a first aspect of the invention, there is provided a method for, in an access device of an access network, controlling an IP packet from a UE, comprising the steps of: receiving an IP packet from a UE; checking said IP packet and determining whether said IP packet is a multicast IP packet that is allowed to pass.

According to a second aspect of the invention, there is provided a controller for, in an access device of an access network, controlling an IP packet from a UE, comprising: a receiver, for receiving an IP packet from a UE; a first determination means for checking said IP packet and determining whether said IP packet is a multicast IP packet that is allowed to pass; a transmitter, for sending the allowed multicast IP packet in multicast form.

When the technical solutions of the present invention are adopted, the access device allows the valid multicast IP packet, for example agent solicitation message and registration request message, to pass, specifically, judges and intercepts some malicious attacks via multicast IP packet, so as to ensure that the DSL access device can support the mobile IPv4, and the UE's service will not be interrupted when the UE moves from one subnet to another.

BRIEF DESCRIPTION OF THE DRAWINGS

Other features, aspects and advantages of the present invention will become obvious by reading the following description of the non-limited embodiments with the aid of appended drawings.

Wherein, same or similar reference numerals refer to the same or similar steps or means.

DETAILED DESCRIPTION OF EMBODIMENTS

Figure 1:
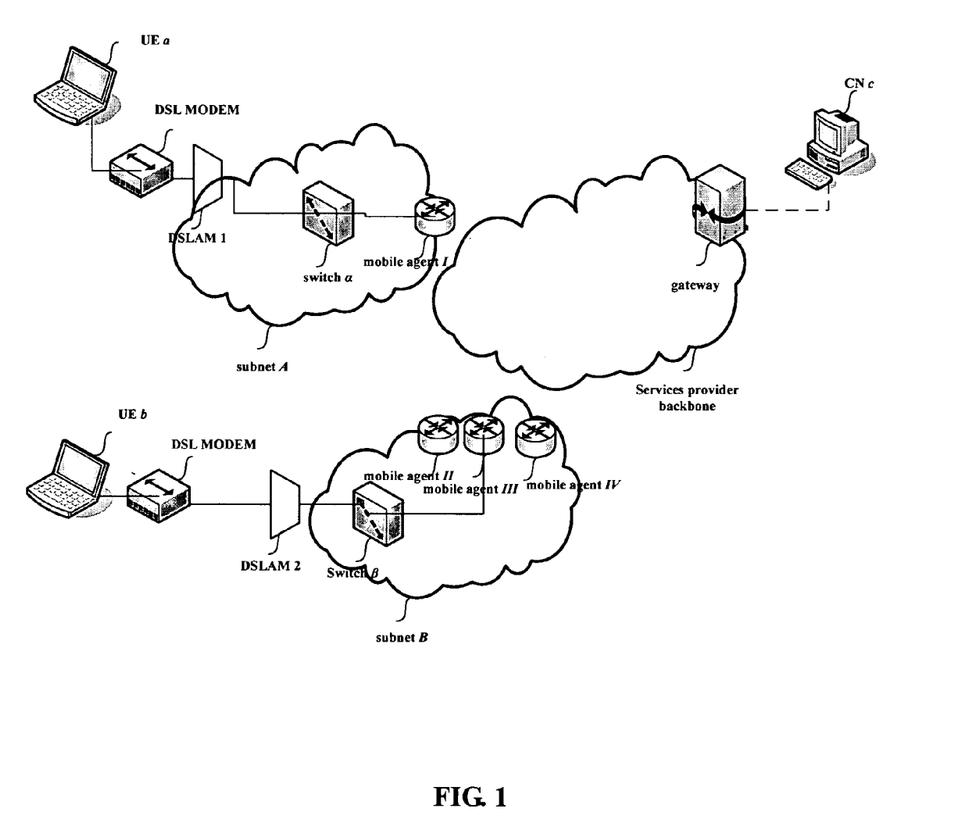
FIG. 1 is an diagram of a telecommunication network that employs DSL access technology.
Figure 2:
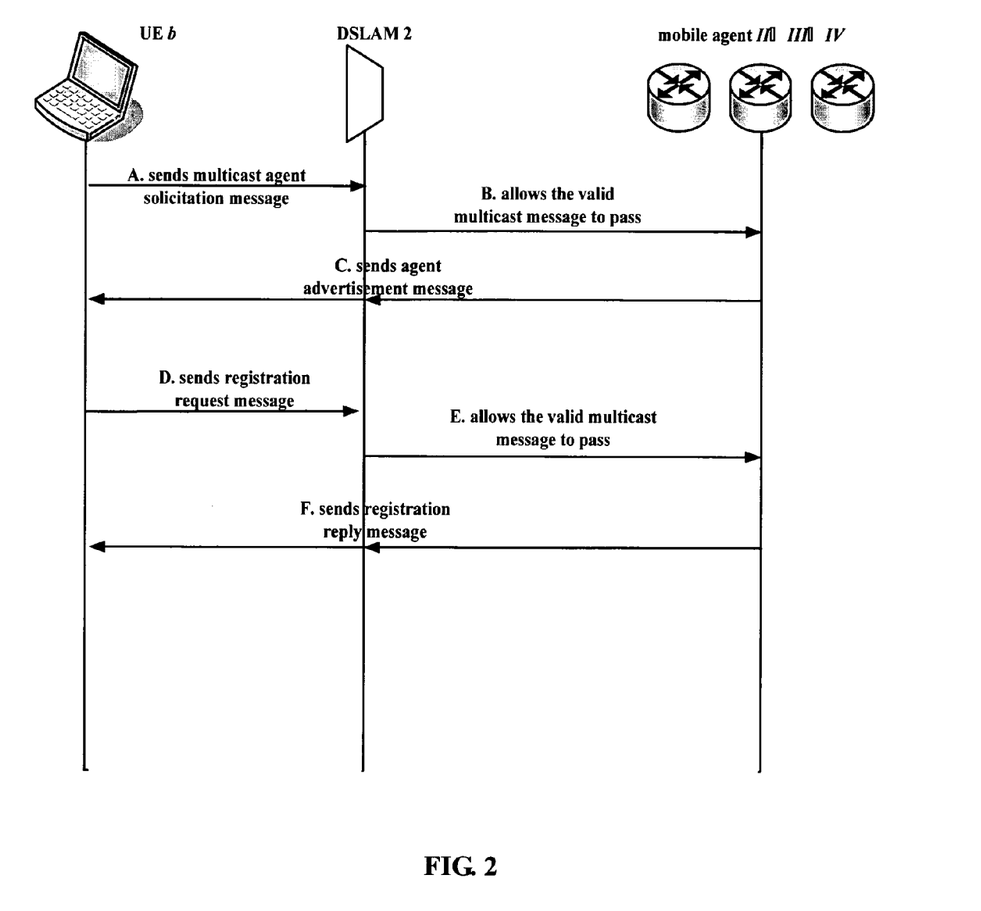
FIG. 2 shows a systematic flowchart of the method for controlling the transmission of multicast IP packets in the telecommunication network in FIG. 1 according to an embodiment of the present invention.

The present invention is described from the system point of view taking the telecommunication network as an example combining FIG. 1 and FIG. 2. Those skilled in the art understand, the present invention is not limited to the telecommunication network based on IP protocol.

For the convenience for description, some concepts in the description are introduced hereinafter:

counterpart node (CN): the two user equipments that communicate with each other are the counterpart one to another.

the permanent address of UE: the operator allocates a global unique network address for each UE. When the UE communicates with its CN, the destination address in the IP packet the UE sends out is the permanent address of its CN.

COA: when the UE moves into a foreign subnet, in order for its HA to forward the IP packet from its CN successfully, the UE needs to register its current COA in use with the HA. After registration, the IP packet destined to the UE will be encapsulated in the HA, and the destination address in the added IP header is the COA.

Suppose a UE a and a UE b belong to a subnet A, and UE a is located in subnet A, while UE B is located in another subnet referred to as subnet B. In FIG. 1, for simplicity, the network devices and related links between the UE a or UE b and a CN c are not shown, and represented as dashes, those skilled in the art can understand that the above omission does not influence the well disclosure of the present invention.

In the present invention, the UE can determine whether it has moved from one subnet to another by the following ways:

Method 1: the UE can determine whether it has moved from one subnet to another by means of the lifetime of AA. To be specific, the UE records the respective elapsed time since the UE receives AA from each mobile agent previously. If the UE hasn't receive another AA from the same mobile agent until the lifetime of the last AA from that mobile agent expires, the UE determines that it has lost connection with the mobile agent, that is to say, it leaves the subnet where the mobile agent is located.

Method 2: the UE can determine whether it has moved from one subnet to another by means of the net prefix of the source address in the AA message, this method applies to case that the AA message carries prefix-lengths extension. To be specific, when the UE receives an AA message sent out by the mobile agent, it compares the network prefix of the source address of the AA message with the network prefix of the source address of the AA message that it previously received. If the two are different, the UE determines that it has moved from previous subnet to another. Usually, each mobile agent in the same subnet has the same network prefix, and mobile agents in different subnets have different network prefix.

Based on the above method, UE a determines that it is still located in its HA, that is subnet A, while UE b determines that it has moved into a foreign subnet.

For the UE a, since it does not move into a foreign subnet, only the regular IP routing protocol in the fixed network operates, that is, the IP packet sourced from the UE a will be sent to the HA via DSLAM 1, as the mobile agent I shown in FIG. 1, then the HA forwards the IP packet to the CN c according to routing protocol.

Since the UE b moves into a foreign subnet, in order for the service handover, the UE b needs to obtain a COA from the dynamic host configuration protocol (DHCP) server or from an AA in the foreign subnet, so as to register with its HA, that is, the mobile agent I shown in FIG. 1. The present invention is discussed as below:

When the COA is COCOA (Co-Located COA)
UE b requests the DHCP server to allocate a COCOA. After it has obtained the COCOA, UE b can directly send RRQ message to mobile agent I for registration. Then the mapping relationship of the permanent address of to UE b and its current COCOA will be generated at the mobile agent I. Then, when the IP packets sent by the CN c arrive, mobile agent I will find out UE b's COCOA from the registration information according to the destination address, i.e. UE b's permanent address, in the IP packet, for instance 162.105.203.16. Then, after the IP packet is encapsulated based on the network layer tunnel protocol, a new IP packet destined to the COCOA is generated and then sent to the network device indicated by the COCOA.

UE b requests DHCP server to allocate a COCOA. After it has obtained a COCOA, UE b further receives AA message from the Foreign Agent (FA) in subnet B, for example, mobile agent II or mobile agent III or mobile agent IV, and the R bit in the AA message is set to 1, it means that UE b still needs to register with the HA, that is mobile agent I via the mobile agent II (or III or IV), wherein, R represents registration-required, that is, even a COCOA is used, the UE is still required to register with the mobile agent.

When the COA is FACOA (Foreign Agent COA)

Besides obtaining COCOA from the DHCP server, UE b can also obtain FACOA from the mobile agent in subnet B, so as to register with mobile agent I. To be specific:

If the lifetime of the AA that the UE formerly received from mobile agent I has expired and it hasn't received any AA from any mobile agent in subnet B, UE b needs to discover a mobile agent to register with, then the method enters step A:

In step A, UE b requests AA message via sending AS to all mobile agents (II, III and IV) in the current subnet, so as to obtain FACOA. The IP source address of the AS comprises the following situations:
  if UE b has already obtained COCOA but it still sends AS, the IP source address should be COCOA;
  if UE b has not obtained COCOA, the IP source address will be the permanent address of UE b;
  if UE b neither has obtained COCOA nor has permanent address, the IP source address is 0.0.0.0.

Since UE b does not know the unicast address of any of mobile agents II, III or IV, the destination address of AS message is the uniform multicast address, for example 224.0.0.11 that can point to all the foreign agents in the subnet B, besides, it can also be a unicast address.

According to one embodiment of the present invention, when the DSLAM 2 receives the IP packet from the UE, it will not simply allow the IP packet to pass, instead, the following steps are carried out:

The received IP packet is checked by DSLAM 2 so as to determine whether the IP packet is a unicast IP packet or multicast IP packet. A unicast IP packet from the UE will be directly allowed to pass. If the received IP packet is a multicast IP packet, a selective filtering will be carried out on the multicast IP packet. The filtering policy comprises but is not limited to:

(1) Filtering the IP Packet Based on its Multicast IP Address

To be specific, the access device, for example the DSLAM 2 in FIG. 1, in the visiting network is configured with valid multicast address list in advance or dynamically. When DSLAM 2 receives the multicast IP packet from the UE, it resolves the multicast address therein, and compares it with the valid multicast address list. If the multicast address of the IP packet is in the valid multicast address list, which means that the multicast address belongs to the valid multicast address, then the DSLAM 2 allows the multicast IP packet to pass, and forwards the packet to the multicast address. If the DSLAM 2 cannot find the multicast address of the multicast IP packet in the valid multicast address list, it will discard it.

The aforesaid method of filtering the IP packet based on its multicast IP address is applicable to the base station of wireless access network, DSLAM in fixed network and other access devices.

Particularly, as for DSLAM, a solution is provided according to one embodiment of the invention:

The DSLAM 2 is configured with multiple valid multicast address lists, each of which corresponds to at least one port at the user side of DSLAM 2. When the UE sends a multicast IP packet via one port at the user side of DSLAM 2, DSLAM 2 searches the valid multicast address list corresponding to the port at its user side, only when the multicast address of the multicast IP packet exists in this valid multicast address list, the DSLAM 2 allows the multicast IP packet to pass. Otherwise, it discards the IP packet.

Since AS and RRQ messages are all sent to the uniform multicast address of all the foreign agents in the subnet, for example 224.0.0.11, in this embodiment, the uniform multicast address of all the foreign agents in the subnet is set as the valid multicast address in the DSLAM 2, so that the AS and RRQ sent in the multicast form can pass successfully.

Besides AS and RRQ messages, if other multicast IP packets sourced from the UE are allowed to be sent to other multicast address, for example, the multicast IP service packet carrying the uplink multicast service, the corresponding multicast address can be configured as another valid multicast address in DSLAM 2.

(2) Filtering the IP Packet Based on the Type of Multicast IP Packet

Taking mobile IPv4 as an example, the value of the protocol field in the IP packet header indicates the protocol type of the IP packet. For example, when the protocol field of the IPv4 header takes a value of 17, it indicates that the IPv4 packet carries UDP (User Datagram Protocol) datagram, and when the destination port field in the UDP header takes a value of 434, it represents a RRQ message.

Then, the allowed multicast IP packet type list can be configured at the DSLAM 2. When the multicast IP packet from the user side arrives, the DSLAM 2 checks its protocol field, for example, obtains the identifier in the header, and compares it with the type list, so as to determine whether the multicast IP packet should be allowed to pass.

In the example, if the filtering is carried out solely according to the protocol field of the multicast IP packet, in order for the AS and RRQ message to pass successfully as well as preventing other multicast IP packet from the user side, only AS and RRQ messages are configured to be allowed to pass in DSLAM 2. For example, after the DSLAM 2 receives the multicast IP packet from the user side, it resolves the header of the packet, to be specific:

an AS message is usually encapsulated in the following form: IPv4+ICMP+AS, that is, an ICMP message is encapsulated in an IPv4 packet, since AS message is one kind of ICMP messages. Specifically, when the protocol type in the IPv4 header is 1, it indicates that the data part of the IPv4 packet comprises ICMP message, when the type field of the ICMP message is 10 and the code field is 0, it indicates that the ICMP message is AS message;

a RRQ message is usually encapsulated in the following form: IPv4+UDP+RRQ, that is, the UDP datagram is encapsulated in IPv4 packet, the mobile IPv4 control message follows the UDP header immediately, when the type field of the control message is 1, it represents a RRQ message. To be specific, when the protocol type of the IPv4 header is 17, it indicates that the data part of the IPv4 packet comprises UDP packet, when the port number in the UDP header is 434 and the type field in the mobile IPv4 control message is 1, the DSLAM 2 determines that it is RRQ message.

When the DSLAM 2 determines that the multicast IP packet is an AS message or RRQ message, the DSLAM 2 allows the multicast IP packet to pass, otherwise, it discards the multicast IP packet.

In another embodiment, the DSLAM 2 needs not determine exactly whether the IP packet is an AS or RRQ message, instead, the DSLAM 2 determines whether the IP packet is allowed to pass according to some segment (or field) value in the IP packet. For example, when the DSLAM 2 discovers that the value of the protocol field in the IPv4 header is 17 or the value of the protocol field in the IPv4 header is 17 and the port number in the UDP header is 434, then the DSLAM 2 determines that it is a allowed (to pass) IP packet. When the DSLAM 2 discovers that the value of the protocol field in the IPv4 header is 1 or the value of the protocol field in the IPv4 header is 1 and the value of the type field in the ICMP message is 10, the DSLAM 2 determines that the IP packet is a allowed packet. Such restriction is less than the restriction for specifically identifying an AS or RRQ message, therefore, some messages satisfying the above conditions apart from AS or RRQ messages will be allowed to pass, within the fault tolerant scope, and, the complexity for system implementation is greatly reduced. Besides, the above conditions can also be used in combination with another embodiment of the invention wherein the DSLAM 2 defends the attacks from malicious users according to the transmission frequency for the specific types of multicast IP packets, which will be discussed below.

Those skilled in the art can understand, the above two filtering method for IP packets can be combined, that is, filtering the IP packet according to both the multicast address and the type of IP packet. For example, only when the value of the protocol field in the IPv4 header is 17 or the port number in the UDP header is 434 or the UDP packet comprises a RRQ message, or when the value of the protocol field in the IPv4 header is 1 or the type field in the ICMP message is 10 or the code field is 0, if the multicast address of the multicast IP packet is a uniform multicast address corresponding to all the mobile agents in the subnet, for example, 224.0.0.11, the multicast IP packet is then allowed to pass, otherwise, the multicast IP packet is discarded.

According to another embodiment of the present invention, the DSLAM 2 defends the attacks from malicious users according to the transmission frequency for the specific types of multicast IP packets, taking AS message as an example:

Those skilled in the art can understand, one port at the user side of DSLAM is connected to the user network via physical links. Based on this, the DSLAM 2 can detect the number of received AS messages in a predetermined duration via the port i at user side, which is connected to the to user network that user b is currently located in. When the number of received AS messages in the predetermined duration exceeds a second predetermined threshold, the subsequent access of the AS message from the port in the predetermined duration will be rejected.

For DSLAM or an access device in wireless network such as base station, it can further detect the number of AS message that a certain UE sends in another predetermined duration. If the number of AS messages received from the UE in said another predetermined duration exceeds a first predetermined threshold, the subsequent access of the AS message from the UE in the other predetermined duration will be rejected.

The predetermined duration, the other predetermined duration, the first predetermined threshold and the second predetermined threshold can be determined based on the demand of the operator or manually based on empirical data, which can be understand by those skilled in the art, the details of which are omitted for simplicity.

When the DSLAM 2 determines that the AS message sent by UE b is valid, DSLAM 2 allows the AS message to pass in step B, and sends it to each mobile agent in the subnet.

After each mobile agent in the subnet receives the AS message, the method enters step C, at least one of the mobile agents II, III and IV sends an AA message as response. For example, the UE b passes authentication via exchanging authentication data with the authentication server, and the authentication server allows UE b to move into the subnet where mobile agents II, III and IV are located, and the authentication server allocates a mobile agent, for example the mobile agent II, for UE b as a foreign agent, then mobile agent II sends an AA message as response. Of course, the rules for selecting at least one mobile agent from the ones which have received the AS message to send AA message to UE b are not limited to the above mentioned rule, which is only an example.

In step D, UE b sends RRQ message to the DSLAM 2. Based on the above description, those skilled in the art can understand, if the RRQ message is sent in multicast form, the DSLAM 2 carries out the corresponding check on the multicast message based on the present invention, so as to determine whether it is allowed to pass. The process that the DSLAM checks the RRQ message is similar to the process of checking an AS message, except for the encapsulating format of IP packet, the details of which are omitted.

The registration in mobile IPv4 is briefly discussed as below, and please refer to RFC1256 and RFC3344 protocols (see http://www.ietf.org/rfc/rfc1256.txt; http://www.ietf.org/rfc/rfc3344.txt for reference), wherein the RFC3344 defines two kinds of registration procedures, one is that the UE registers with its HA via the FA, that is, the UE sends the RRQ message to FA, and FA forwards the RRQ message to HA; the other is that the UE directly registers with its HA, that is, the UE directly sends the RRQ message to its HA. The system can determine which kind of registration procedure can be applied to the UE based on the following rules:

if a UE needs to register the FACOA allocated by the FA with its HA, the UE should register via the FA;
if the UE registers with its HA with a COCOA, and the UE receives an AA message from a FA in the current subnet, and the R bit in the AA message is set to 1, the user should register via the FA or other FAs in the current subnet;
if the UE returns to its home subnet, and needs to register again with its HA, the UE must register directly with its HA.

The process of forwarding the service data after registration will be introduced briefly with reference to FIG. 1.

After the registration is completed, the IP packets sent to UE b by CN c first reaches the HA, for example, the mobile agent I in FIG. 1. Then, the HA forwards the IP packet by means of the network layer tunnel technology, that is, IP-in-IP technology. The entrance for the network layer tunnel is the HA, as for the exit: when the UE b registers directly its COCOA with the HA, the exit for the network layer tunnel is UE b; when UE b registers indirectly with its HA via a FA in the subnet B, the exit for the network layer tunnel is the FA.

Now, referring to FIG. 3 in conjunction with FIG. 1, the method for controlling the IP packet from a UE in an access device of an access network according to one embodiment of the present invention will be described in detail, wherein FIG. 2 and the related description are taken together as reference.

In step S10, the access device, such as the DSLAM 2 receives the IP packet from the UE b. The IP packet can be a multicast IP packet or unicast IP packet.

Then, the DSLAM 2 analyzes the IP packet, so as to determine whether it is allowed to pass. To be specific, in step S11, the DSLAM 2 determines whether the IP packet is a multicast IP packet that is allowed to pass. Of course, if the IP packet is a unicast IP packet, then it will be allowed to pass; if it is a multicast IP packet, then if at least one of the following two conditions is satisfied, the IP packet is allowed to pass and forwarded in the multicast form:

i) the destination multicast address of the multicast IP packet belongs to the predetermined valid multicast address. In one embodiment of the invention, DSLAM 2 maintains a multicast access control list (MACL), if the destination multicast address of the multicast IP packet is an address which is pre-stored in the MACL, for example, a uniform multicast address 224.0.0.11 that corresponds to all the mobile agents in the subnet, then when by default, the possibility of the attack to DSLAM 2 that launched by the multicast IP packet destined to the multicast address is very small, all multicast IP packets destined to the multicast address will be allowed to pass.

ii) the IP packet is a predetermined type of multicast IP packet, for example, the agent solicitation message or registration request message sent in multicast form. If by default, the above types of multicast messages are all sent to the uniform multicast address corresponding to all the foreign agents in the subnet, for example, 224.0.0.11, then there is no need to filter the packet based on the multicast address, instead, after the type of an IP packet is identified, the DSLAM can directly multicast the packet or discard it based on its type.

Those skilled in the art can understand the combination of i) and ii) for controlling the access of multicast IP packet according to the teaching of the application document without inventive works, therefore, it is unnecessary to give more details.

According to another embodiment of the present invention, in order to avoid the malicious user to launch attacks with multicast message, in step S11, before the multicast IP packet is allowed to pass, there is further determining steps, which can be divided into two situations:

when the IP packet received from a UE is the predetermined type of multicast IP packet, then the DSLAM determines whether the times for the UE to send the predetermined type of multicast IP packet have exceeded a first predetermined value; when the times for the UE to send the predetermined type of multicast IP packet have not exceeded the first predetermined value, then the IP packet is deemed as the allowed multicast IP packet. The period can be infinitely long, or can be as short as a time unit namely, an hour, one minute or a second.

in case that the access network is fixed access network, when the IP packet received from a port at the user side is said predetermined type of multicast IP packet, the DSLAM determines whether the times of the predetermined type of multicast IP packet received from the user side port in a second predetermined period have exceeded a second predetermined value; when the times of the predetermined type of multicast IP packet received from the user side port in the second predetermined period have not exceeded the second predetermined value, then the IP packet is deemed as the allowed multicast IP packet.

The aforementioned first and second predetermined period and first and second predetermined value can be determined based on the demand of the operator or manually based on empirical data, which can be understand by those skilled in the art, the details of which are omitted for simplicity.

If it is determined that the IP packet sent by UE is the multicast IP packet that is allowed to pass, the method then enters step S12, wherein the multicast IP packet is sent in multicast form.

If it is determined that the IP packet sent by UE is the multicast IP packet that is not allowed to pass, the method then enters step S12', and the multicast IP packet is discarded.

If the IP packet is a unicast packet, then DSLAM 2 forwards the unicast IP packet in step S12".

Figure 3:
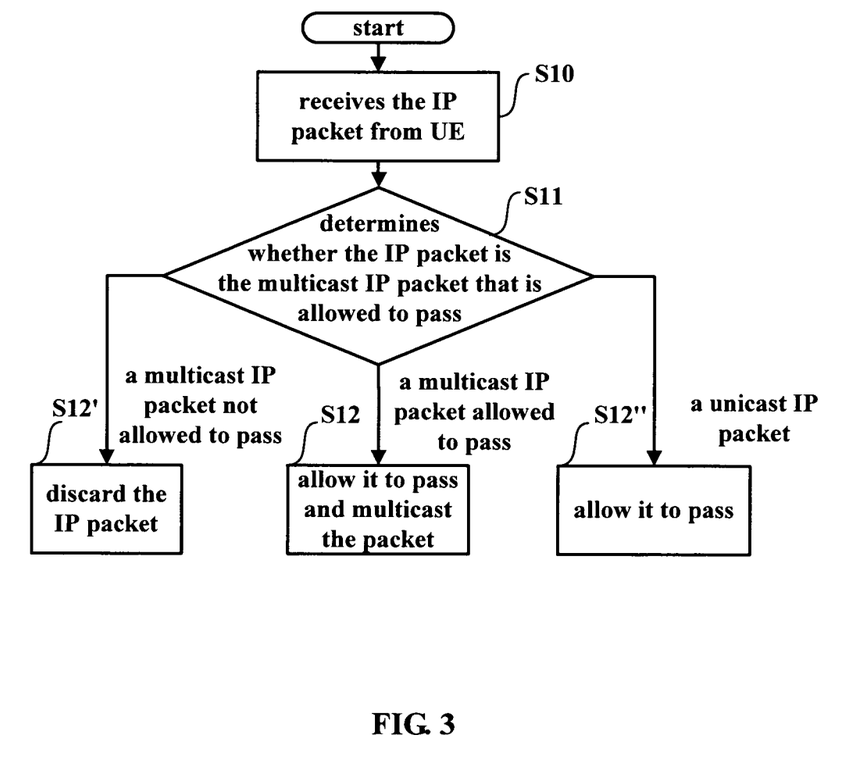
FIG. 3 shows a flowchart of the method for controlling the transmission of multicast IP packets in the access device in an access network according to an embodiment of the present invention.
Figure 4:
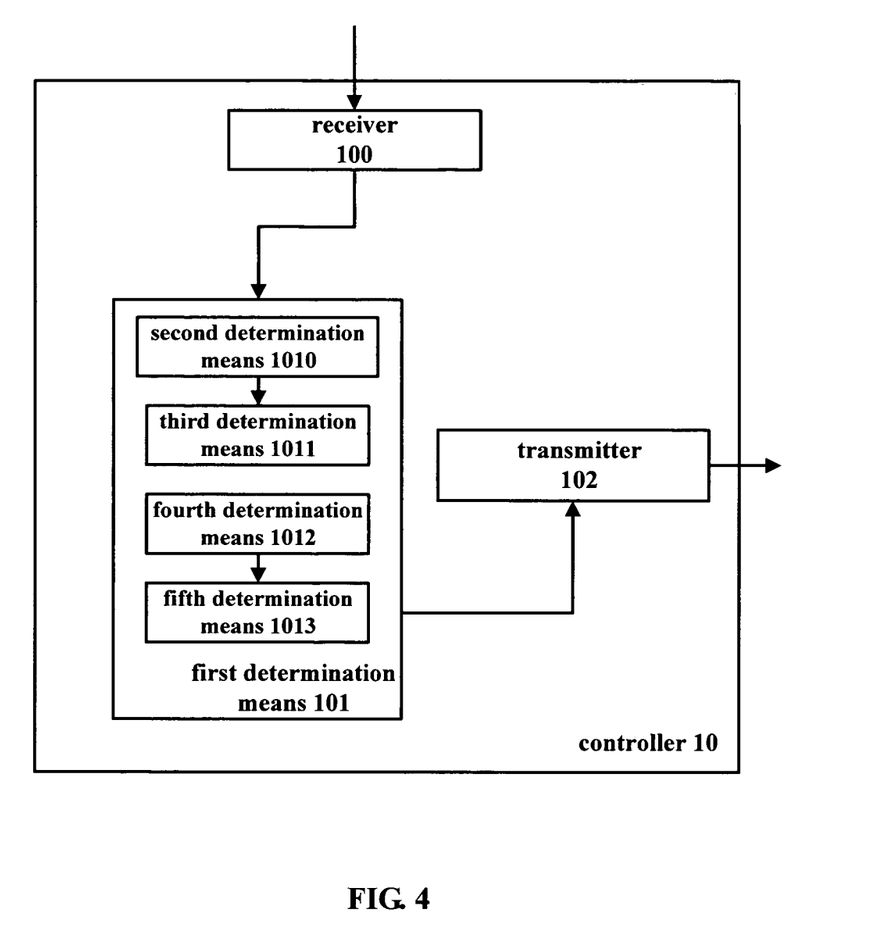
FIG. 4 shows a block diagram for controlling the transmission of the multicast IP packets in an access device of an access network according to an embodiment of the present invention.

Now, referring to FIG. 4 and in conjunction with FIG. 1, the detailed descriptions will be given to the embodiments of the controller for controlling the IP packet from the UE in the access device in the access network according to the second aspect of the present invention, wherein, the related description about FIG. 2 and FIG. 3 are taken together as reference. The controller 10 in FIG. 4 is located in the access devices such as DSLAM 2, comprising: a receiver 100, a first determination means 101, a transmitter 102. To be specific, the first determination means 101 comprises: a second determination means 1010, a third determination means 1011, a fourth determination means 1012 and a fifth determination means 1013.

The receiver 100 is configured to receive the IP packets from UE b. The IP packet can be a multicast IP packet or a unicast IP packet.

Then, the first determination means 101 of the access device checks the IP packet, so as to determine whether it is the multicast IP packet that is allowed to pass. If the IP packet is a unicast IP packet, then it is allowed to pass; if it is multicast IP packet, then if at least one of the following two conditions is satisfied, the IP packet is then allowed to pass:

i) the destination multicast address of the multicast IP packet belongs to the predetermined valid multicast address. In one embodiment of the invention, the DSLAM 2 maintains a MACL, if the destination multicast address of the multicast IP packet is the address that pre-stored in the MACL, for example, a uniform multicast address 224.0.0.11 that corresponds to all the mobile agents in the subnet, then when by default, the possibility of the attack to DSLAM 2 launched by the multicast IP packet destined to the multicast address is very small, the access of all the multicast IP packet destined to the multicast address will be allowed.

ii) the IP packet is a predetermined type of multicast IP packet, for example, the agent solicitation message or registration request message sent in multicast form. If by default, the above types of multicast messages are all sent to the uniform multicast address corresponding to all the foreign agents in the subnet, for example, 224.0.0.11, then there is no need to filter the packet based on the multicast address, instead, after the type of the IP packet is identified, the DSLAM can directly multicast the packet or discard it based on its type.

Those skilled in the art can understand the combination of i) and ii) for controlling the access of multicast IP packet according to the teaching of the application document without inventive works, therefore, it is unnecessary to give more details.

According to another embodiment of the present invention, in order to avoid the malicious user to launch attacks with multicast message, the first determination means 101 further comprises two sub means:

The second determination means 1010 is configured to, when the received IP packet from a UE is a predetermined type of multicast IP packet, determining whether the times for the UE to send the predetermined type of multicast IP packet have exceeded a first predetermined value.

The third determination means 1011, for when the times for the UE to send the predetermined type of multicast IP packet have not exceeded the first predetermined value, taking the IP packet as a allowed multicast IP packet. The period can be infinitely long, or can be as short as a time unit, saying an hour, one minute or a second.

When the controller 10 is located in an access device of a fixed access network, the first determination means 101 further comprises the following sub device:

A fourth determination means 1012 which is configured to, when the IP packet received from a user side port is a predetermined type of multicast IP packet, determine whether the times of the predetermined type of multicast IP packet received from the user side port in a second predetermined period have exceeded a second predetermined value.

A fifth determining means 1013 which is configured to, when the times of the predetermined type of multicast IP packet received from the user side port in the second predetermined period have not exceeded the second predetermined value, take the IP packet as a allowed multicast IP packet.

The transmitter 102 in the DSLAM 2 is configured to send the allowed multicast IP packet and unicast IP packet respectively.

The embodiments of the present invention have been described above. It is understandable by those skilled in the art that the present invention is not limited to specific system, device or protocol, and various modifications or amendments can be made without departing from the scope and spirit of the scope of the attached claims.

What is claimed is:

1. A method for, in an accessing device of an access network, controlling an IP packet from a user equipment, comprising:
    a. receiving an IP packet from a user equipment;
    b. checking said IP packet and determining whether said IP packet is a multicast IP packet that is allowed to pass, and if said IP packet is a multicast IP packet that has a multicast address that belongs to a desired valid multicast address, or if said IP packet is a desired type of multicast IP packet, taking said IP packet as said allowed multicast IP packet, wherein,
        if the IP packet received from the UE is said desired type of multicast IP packet, determining whether a time for the UE to send said desired type of multicast IP packet has exceeded a first desired value, and
        if a time for the UE to send the desired type multicast IP packet has not exceeded the first desired value, taking the IP packet as the allowed multicast IP packet; and
    c. in case that said IP packet is a multicast IP packet that is allowed to pass, sending said allowed multicast IP packet in multicast form.

2. A method according to claim 1, wherein said access network is based on, mobile IPv4 protocol, and said desired type of multicast IP packet comprises a multicast IP controlling packet.

3. The method of claim 2, wherein said multicast IP controlling packet comprises mobile IP controlling message and/or ICMP router discovery message.

4. A method according to claim 3, wherein said mobile IP controlling message comprises a registration request message, and said ICMP router discovery message comprises an agent solicitation message.

5. A method for, in an accessing device of an access network, controlling an IP packet from a user equipment, comprising:
   a. receiving an IP packet from a user equipment;
   b. checking said IP packet and determining whether said IP packet is a multicast IP packet that is allowed to pass, and if said IP packet is a multicast IP packet that has a multicast address that belongs to a desired valid multicast address, or if said IP packet is a desired type of multicast IP packet, taking said IP packet as said allowed multicast IP packet, wherein,
   said access network is a fixed access network, and
   if the IP packet received from a user side port is said desired type of multicast IP packet, determining whether a time of the desired type of multicast IP packet received from the user side port in a second desired period has exceeded a second desired value, and
   if a time of the desired type of multicast IP packet received from the user side port in the second desired period has not exceeded the second desired value, taking the IP packet as the allowed multicast IP packet; and
   c. in case that said IP packet is a multicast IP packet that is allowed to pass, sending said allowed multicast IP packet in multicast form.

6. A controller for, in an accessing device of an access network, controlling an IP packet from a user equipment, comprising:
   a receiver configured to receive an IP packet from a user equipment;
   a first determination means configured to check said IP packet and determine whether said IP packet is a multicast IP packet that is allowed to pass, and if said IP packet is a multicast IP packet that has a multicast address that belongs to a desired valid multicast address, or if said IP packet is a desired type of multicast IP packet, take said IP packet as said allowed multicast IP packet;
   a second determination means configured to, if the IP packet received from the user equipment is said desired type of multicast IP packet, determine whether a time for the UE to send said desired type of multicast IP packet has exceeded a first desired value;
   a third determination means configured to, if a time for the UE to send the desired type of multicast IP packet has not exceeded the first desired value, take the IP packet as the allowed multicast IP packet; and
   a transmitter configured to send said allowed multicast IP packet in multicast form.

7. A controller according to claim 6, wherein said access network is based on mobile IPv4 protocol, and said type of multicast IP packet comprises a multicast IP controlling packet.

8. A controller according to claim 7, wherein said multicast IP controlling packet comprises mobile IP controlling message and/or ICMP router discovery message.

9. A controller according to claim 8, wherein said mobile IP controlling message comprises a registration request message, and said ICMP router discovery message comprises an agent solicitation message.

10. An access device in access network, comprising the controller of claim 6.

11. A controller for, in an accessing device of an access network, controlling an IP packet from a user equipment, comprising:
   a receiver configured to receive an IP packet from a user equipment;
   a first determination means configured to check said IP packet and determine whether said IP packet is a multicast IP packet that is allowed to pass, and if said IP packet is a multicast IP packet that has a multicast address that belongs to a desired valid multicast address, or if said IP packet is a desired type of multicast IP packet, take said IP packet as said allowed multicast IP packet, wherein said access network is a fixed access network;
   a second determination means configured to, if the IP packet received from a user side port is said desired type of multicast IP packet, determine whether a time of the desired type of multicast IP packet received from the user side port in a second desired period has exceeded a second desired value;
   a third determination means configured to, if a time of the predetermined type of multicast IP packet received from the user side port in the second desired period has not exceeded the second desired value, take the IP packet as the allowed multicast IP packet; and
   a transmitter configured to send said allowed multicast IP packet in multicast form.

* * * * *